United States Patent
Baumann et al.

(10) Patent No.: US 7,040,463 B2
(45) Date of Patent: May 9, 2006

(54) DISK BRAKE WITH SELF-BOOSTING

(75) Inventors: Dietmar Baumann, Hemmingen (DE);
Dirk Hofmann, Ludwigsburg (DE);
Herbert Vollert, Vaihingen/Enz (DE);
Willi Nagel, Remseck/Hochdorf (DE);
Andreas Henke, Diemelstadt (DE);
Bertram Foitzik, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/873,455

(22) Filed: Jun. 23, 2004

(65) Prior Publication Data
US 2004/0262098 A1  Dec. 30, 2004

(30) Foreign Application Priority Data
Jun. 24, 2003  (DE) ................. 103 28 243

(51) Int. Cl.
*F16D 55/14* (2006.01)
(52) U.S. Cl. ............... 188/72.2; 188/70 B; 188/71.8; 188/71.9; 188/156; 188/162; 188/72.7

(58) Field of Classification Search ............... 188/72.7, 188/72.1, 71.7, 71.8, 71.9, 1.11 W, 79.51, 188/79.56, 196 R, 196 C, 156, 162, 72.3, 188/72.8, 196 D, 157, 72.2, 70 B
See application file for complete search history.

(56) References Cited

U.S. PATENT DOCUMENTS

| | | | |
|---|---|---|---|
| 6,012,556 A * | 1/2000 | Blosch et al. ............... 188/71.8 |
| 6,279,691 B1 * | 8/2001 | Takahashi et al. ......... 188/72.8 |
| 6,478,120 B1 * | 11/2002 | Runkel et al. ............. 188/71.9 |
| 6,491,140 B1 * | 12/2002 | Usui et al. ................. 188/72.1 |
| 6,854,572 B1 * | 2/2005 | Usui ........................... 188/72.8 |
| 6,880,680 B1 * | 4/2005 | Watanabe et al. ........... 188/72.8 |
| 2003/0042084 A1 * | 3/2003 | Kawase et al. ............. 188/72.1 |

* cited by examiner

*Primary Examiner*—James McClellan
*Assistant Examiner*—Mariano Sy
(74) *Attorney, Agent, or Firm*—Ronald E. Greigg

(57) ABSTRACT

An electromechanically actuated disk brake with mechanical self-boosting includes an automatic wear readjusting device, which can for instance have a positive-engagement detent device. An increased air clearance caused by wear of friction brake linings is prevented by the invention, which thus also prevents an increase in the displacement of the friction brake lining in the direction of rotation of the brake disk when the disk brake is actuated in order to attain the self-boosting.

9 Claims, 2 Drawing Sheets

DISK BRAKE WITH SELF-BOOSTING

BACKGROUND OF THE INVENTION

1. Field of the Invention

The invention relates to an improved disk brake with self-boosting.

2. Description of the Prior Art

Disk brakes are known that have a friction brake lining, which for braking can be pressed by an actuation unit against a brake disk, and a self-boosting device which converts a frictional force, which the rotating brake disk upon braking exerts on the friction brake lining pressed against it, into a contact-pressure force, that in addition to the actuation unit presses the friction brake lining against the brake disk. As a result, a contact-pressure force to be exerted by the actuation unit is reduced and self-boosting is attained.

Mechanical self-boosting devices with wedge mechanisms or lever systems are known. The wedge mechanisms are also known as ramp mechanisms. This list is not exhaustive. Wedge mechanisms have a wedge on a back side of the friction brake lining, remote from the brake disk, that is braced on a ramp. If the friction brake lining for braking is pressed by the actuation unit against the rotating brake disk, the frictional force exerted by the rotating brake disk on the friction brake lining pressed against it displaces the friction brake lining in the direction of a narrowing wedge gap between the counterpart wedge and the brake disk. As a force of reaction, the counterpart wedge exerts a force on the wedge that has one component transverse to the brake disk. This force transverse to the brake disk is an additional contact-pressure force, which in addition to the actuation unit presses the friction brake lining against the brake disk and as a result increases the total contact-pressure force, resulting in the self-boosting. In the case of lever mechanisms, the friction brake lining in braking is braced on a lever that is oblique to the brake disk at a support angle. The support angle corresponds to the wedge angle in the wedge mechanism; both mechanisms are mechanically comparable to one another.

Still other self-boosting systems, for instance hydraulic ones, are also known.

The problem exists that a displacement travel distance, by which distance the friction brake lining must be displaced in order to actuate the disk brake until it rests on the brake disk, increases with increasing wear of the friction brake lining.

OBJECTS AND SUMMARY OF THE INVENTION

The disk brake of the invention has a return-travel limiter for the friction brake lining, which limits a travel by which the friction brake lining is lifted from the brake disk upon release of the brake. As a result, upon release of the disk brake, the friction brake lining is not always moved transversely away from the brake disk to its original outset position, with the consequence of an increasing spacing, with increasing wear of the friction brake lining, between the friction brake lining and the brake disk; instead, the spacing (air clearance) between the friction brake lining and the brake disk is limited.

The disk brake of the invention furthermore has a bracing means for the friction brake lining, on which bracing means, upon braking, the friction brake lining is braced at a support angle obliquely to the brake disk. The bracing means is movable only in the direction of the brake disk and has a return-travel block. For brake actuation, the bracing means is movable only in the direction toward the brake disk, but not away from it. For changing the friction brake lining, the bracing means can be restorable away from the brake disk. The term return-travel block, unlike the return-travel limiter for the friction brake lining, has been selected because in the friction brake lining, a limited return travel should be possible, to enable lifting the friction brake lining from the brake disk when the disk brake is released. This is not necessary in the case of the bracing means for the friction brake lining. Nevertheless, even with the bracing means, a limited return travel away from the brake disk may be possible; that is, in principle, the return-travel limiter of the friction brake lining and the return-travel block of the bracing means may be embodied identically.

The invention additionally provides a spring element, which urges the bracing means in the direction of the brake disk.

For braking, the friction brake lining of the disk brake of the invention is, as in known disk brakes that have self-boosting, pressed against the brake disk by the actuation unit. The self-boosting device brings about the desired self-boosting. Upon release of the disk brake, the return travel by which the friction brake lining is lifted from the brake disk is limited by the return-travel limiter. With increasing wear of the friction brake lining, the friction brake lining accordingly no longer returns to its original outset position but instead, depending on its wear, remains closer to the brake disk, so that the air clearance between the brake disk and the friction brake lining remains approximately constant. Because the friction brake lining no longer returns to its original outset position, the bracing means is displaced by the spring element toward the brake disk. The return-travel block prevents the bracing means, upon the next brake actuation, from moving away from the brake disk. Thus with increasing wear of the friction brake lining, the friction brake lining and the bracing means move in the direction of the brake disk, so that the air clearance between the friction brake lining and the brake disk and a displacement travel distance of the friction brake lining parallel to the brake disk upon actuation of the disk brake do not increase, or increase to only a limited extent. The motion of the friction brake lining and of the bracing means in the direction of the brake disk with increasing wear of the friction brake lining can be effected either continuously or intermittently.

The invention has the advantage that the displacement travel distance of the friction brake lining for actuating the disk brake does not increase, or increases only to a limited extent. This has the advantage that a tightening time upon actuation of the disk brake is not lengthened by wear to the friction brake lining.

Moreover, the disk brake of the invention can be made smaller, because the displacement travel distance of the friction brake lining required for braking is not lengthened parallel to the brake disk by wear to the friction brake lining.

A further, considerable advantage is also attained in disk brakes with self-boosting that varies over the displacement travel distance of the friction brake lining. The self-boosting devices that vary with the displacement of the friction brake lining have been proposed, for instance to move the friction brake lining transversely to the brake disk quickly for overcoming the air clearance between the brake disk and the friction brake lining, and to attain greater self-boosting in the presence of major braking forces. In a wedge or ramp mechanism, the varying self-boosting is attained by means of a wedge angle that varies in the longitudinal direction of the wedge. If in this kind of self-boosting the displacement travel distance of the friction brake lining, for overcoming the air clearance resulting from wear to the friction brake lining, changes, then the self-boosting that is operative at a certain contact-pressure force also changes, since the friction brake lining is located at a different point on the ramp from that which is structurally provided, and thus is braced at a different support angle from what was intended. In the disk brake of the invention, the situation is different, since the friction brake lining, because of the bracing means that approaches the brake disk in accordance with the wear to the friction brake lining, at a certain contact-pressure force, is always braced at least approximately at the same point of the bracing means and thus at the intended support angle.

The disk brake of the invention is intended in particular for electromechanical actuation in which the pressing of the friction brake lining against the brake disk is effected in particular by means of an electric motor via a rotation/translation conversion gear, for instance in the form of a helical gear; a step-down gear may be provided between the electric motor and the helical gear. The self-boosting is provided mechanically in particular.

One embodiment provides a restoring device with which the bracing means and/or the return-travel limiter can be restored to its outset position for changing the friction brake linings.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1:
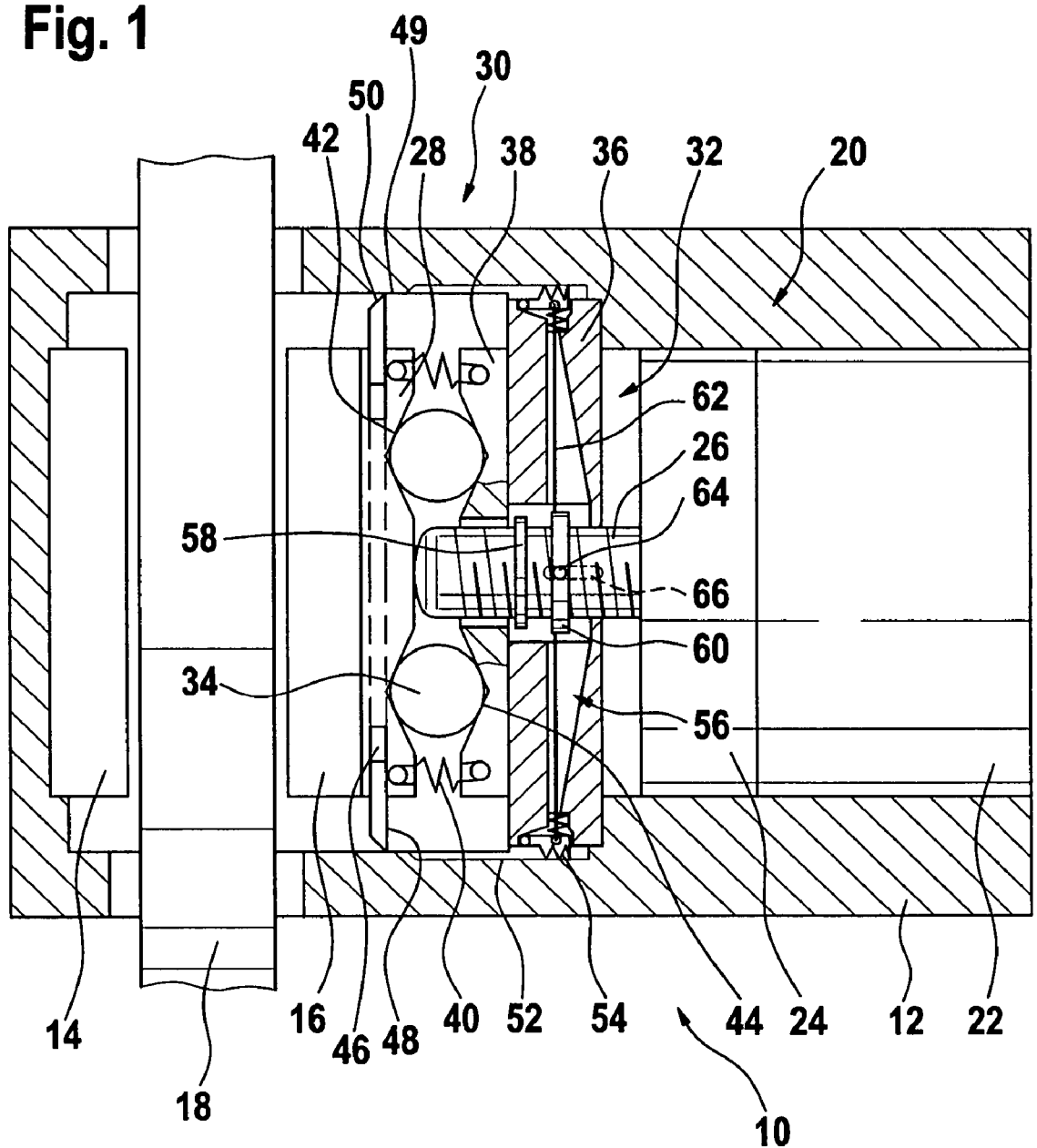
FIG. 1 schematically shows a disk brake of the invention, looking radially inward, that is, from the direction of an imaginary axis of rotation of a brake disk.

The disk brake 10 of the invention shown in FIG. 1 has a brake caliper 12, in which two friction brake linings 14, 16 are located. Between the two friction brake linings 14, 16, there is one brake disk 18. One of the two friction brake linings 14 is disposed fixedly in the caliper 12, or is braced parallel to the brake disk 18 via a stator (brake retainer) not shown in the drawing. For braking, the other friction brake lining 16 can be pressed by an actuation unit 20 against the brake disk 18. The caliper 12 is embodied as a so-called floating caliper; it is displaceable transversely to the brake disk 18, so that contact pressure against the movable friction brake lining 16 displaces the caliper 12 transversely to the brake disk 18, so that it presses the fixed friction brake lining 14 against the other side of the brake disk 18.

An electromechanical actuation unit 20 it includes an electric motor 22 with a step-down gear 24 flanged to it and with a spindle drive which forms a rotation/translation conversion gear, for converting the rotary driving motion of the electric motor 22 or of the step-down gear 24 into a translational motion, pressing the friction brake lining 16 against the brake disk 18. All that can be seen of the spindle drive in the drawing is a spindle 26. For the rest, the spindle drive is located in a housing of the step-down gear and is therefore not visible in the drawing. Likewise, all that can be seen of the electric motor 22 and the step-down gear 24 is their housings. The spindle 26 presses with its face end against a wedge plate 28, on whose side toward the brake disk 18 the movable friction brake lining 16 is secured.

The disk brake 10 has a mechanical self-boosting device 30. The self-boosting device 30 includes, besides the wedge plate 28, a bracing means 32 and roller bodies 34 that are disposed between the wedge plate 28 and the bracing means 32. The bracing means 32 includes a base plate 36 and a ramp plate 38, which is secured to the base plate 36 on a side of the base plate 36 toward the wedge plate 28 and the brake disk 18. The spindle 26 of the spindle drive of the actuation unit 20 penetrates the bracing means 32, through a hole. Spring elements 40 embodied as tension springs connected the wedge plate 28 and the ramp plate 38 spring-elastically to one another and act upon the bracing means 32 with a spring force acting in the direction of the brake disk 18.

The wedge plate 28, and together with it, the movable friction brake lining 16 are displaceable parallel to the brake disk 18 in the caliper 12.

The wedge plate 28, on its side remote from the brake disk 18, has indentations 42 of V-shaped cross section. Cheek faces of the V-shaped indentations 42 form wedge faces; the V-shaped indentations 42 form double wedges, which can also have different wedge angles. The V-shaped indentations 42 that form the double wedges will hereinafter be called double wedges, that, or simply wedges, and like the indentations themselves will be identified by reference numeral 42.

The ramp plate 38 has identical indentations 44 of V-shaped cross section, which are disposed opposite the double wedges 44. These V-shaped indentations 44 form double ramps and will hereinafter be called that, or simply ramps. The roller bodies 34, which in the exemplary embodiment of the invention shown and described are embodied as rollers, rest in opposed V-shaped indentations that the double wedges 42 and the double ramps 44 form.

The self-boosting device 30 functions as follows:

If the actuation unit 20, for braking, presses the movable friction brake lining 16 against the rotating brake disk 18, the latter exerts a frictional force on the friction brake lining 16, which displaces the friction brake lining 16 in the caliper 12 both parallel to the brake disk 18 and in the direction of rotation thereof. Along with the friction brake lining 16, the wedge plate 28 is displaced, and consequently the roller bodies 34 roll on the double wedges 42 and the double ramps 44. The roller bodies 34 each roll on one wedge face of the double wedges 42 and one corresponding, diagonally opposed ramp face of the double ramps 44. The respective other wedge face and ramp face is intended for displacement of the friction brake lining 16 in the opposite direction, upon a reversed direction of rotation of the brake disk 18. Via the roller bodies 34, the friction brake lining 16 is braced on the ramp plate 38 of the bracing means 32. The displacement of the friction brake lining 16 that in braking is pressed against the brake disk 18 causes, because of the bracing via the roller bodies 34 on the ramp and wedge faces, a force component perpendicular to the brake disk 18, or in other words an additional contact-pressure force of the friction brake lining 16 against the brake disk 18. This contact-pressure force is operative in addition to the contact-pressure force exerted by the actuation unit 20. The disk brake 10 thus has self-boosting, which increases the braking force.

An elastically bendable plate 48 is inserted into slots 46 in the wedge plate 28. The plate 48 protrudes laterally out of the wedge plate 28, and because of the guidance in the slots 46, the wedge plate 28 is displaceable parallel to the brake disk 18 relative to the elastic plate 48. The elastic plate 48 is embodied in continuous form, which is represented in the drawing by dashed lines in the middle region of the elastic plate 48. The outer edges of the elastic plate 48 are embodied obliquely as a result of a chamfer 50; with elastic prestressing of the plate 48, they rest on inside faces 49, oriented toward one another, of the caliper 12.

If for braking the friction brake lining 16 is pressed against the brake disk 18 by the actuation unit 20, the plate 48 bends elastically. If the disk brake 10 is released again after the braking, the elastic plate 48 returns to its flat, relaxed original shape. In the process, the elastic plate 48 lifts the movable friction brake lining 16 from the brake disk 18. If the motion of the friction brake lining 16 on being pressed against the brake disk 18 increases because of wear to the friction brake lining 16, then the outer edges of the elastic plate 48 slide along the inside faces 49 of the caliper, in the direction of the brake disk 18. As a consequence, when the disk brake 10 is released the friction brake lining 16 is no longer lifted away from the brake disk 18 as far as its outset position but instead less, by the length of a displacement travel distance of the outer edges of the elastic plate 48. As a result, the wear to the friction brake linings 14, 16 is compensated for. The elastic plate 48 cooperating with the inside faces 49 of the caliper 12 forms a return-travel limiter for the friction brake lining 16.

The base plate 36 of the bracing means 32 has pawls 54 on its sides, which are pressed outward spring-elastically and mesh with sets of teeth 52 of the caliper 12. The pawls 54 cooperating with the sets of teeth 52 form a return-travel block for the bracing means 32; the bracing means 32 can be moved only in the direction toward the brake disk 18, but not away from it.

If because of wear to the friction brake linings 14, 16 the elastic plate 48 has been displaced along the inside faces 49 of the caliper 12 in the direction of the brake disk 18, the spring elements 40, which connect the wedge plate 28 with the ramp plate 38, pull the ramp plate 38 and with it the bracing means 32 in the direction of the brake disk 18, so that the pawls 54, offset by one tooth in the direction of the brake disk 18, come to mesh with the sets of teeth 52. As a result of wear to the friction brake linings 14, 16, the bracing means 32 thus readjusts in the direction of the brake disk 18 as well. The elastic plate 48 forming the return-travel limiter of the friction brake lining 16 and the locking pawls 54 that form the return-travel block of the bracing means 32 form a readjusting device, which automatically compensates for wear to the friction brake linings 14, 16. A displacement travel distance of the friction brake lining 16 parallel to the brake disk 18 upon braking is thus prevented from being longer with increasing wear to the friction brake linings 14, 16.

The elastic plate 48, which forms the return-travel limiter of the friction brake lining 16 and cooperates with the inside faces 49 of the caliper 12, acts by frictional engagement. The pawls 54, which form the return-travel block of the bracing means 32 and cooperate with the sets of teeth 52 of the caliper 12, operate by positive engagement.

For changing the friction brake linings 14, 16, the disk brake 10 has a restoring device 56. It includes a first ring 58, which is disposed fixedly on the spindle 26 and therefore moves along with the spindle 26, and a second ring 60, which is axially displaceable on the spindle 26 and is located at the level of the pawls 54. The first ring 58 is located between the brake disk 18 and the second ring 60. The pawls 54 are connected to the second ring 60 by tension cables 62. The second ring 60 is retained axially displaceably but in a manner fixed against relative rotation by a pin 64, protruding radially outward from it, which engages an oblong slot 66 in the caliper 12. The oblong slot 66, which is represented by dashed lines in the drawing, extends axially parallel to the spindle 26 and forms a longitudinal guide for the second ring 60.

For restoring the bracing means 32, the spindle 26 is rotated in reverse; that is, it moves away from the brake disk 18. With the spindle 26, the first ring 58 also moves away from the brake disk 18 and strikes the second ring 60 and carries it along with it. With the tension cables 62, the second ring 60 puts the pawls 54 out of engagement with the sets of teeth 52, and as a result the base plate 36 of the bracing means 32 becomes movable away from the brake disk 18. Via the second ring 60, the first ring 58 carries the base plate 36, with the reverse-rotating spindle 26, along with it to its outset position. The wedge plate 28 and the ramp plate 38 can be pressed back into their outset position.

Figure 2:
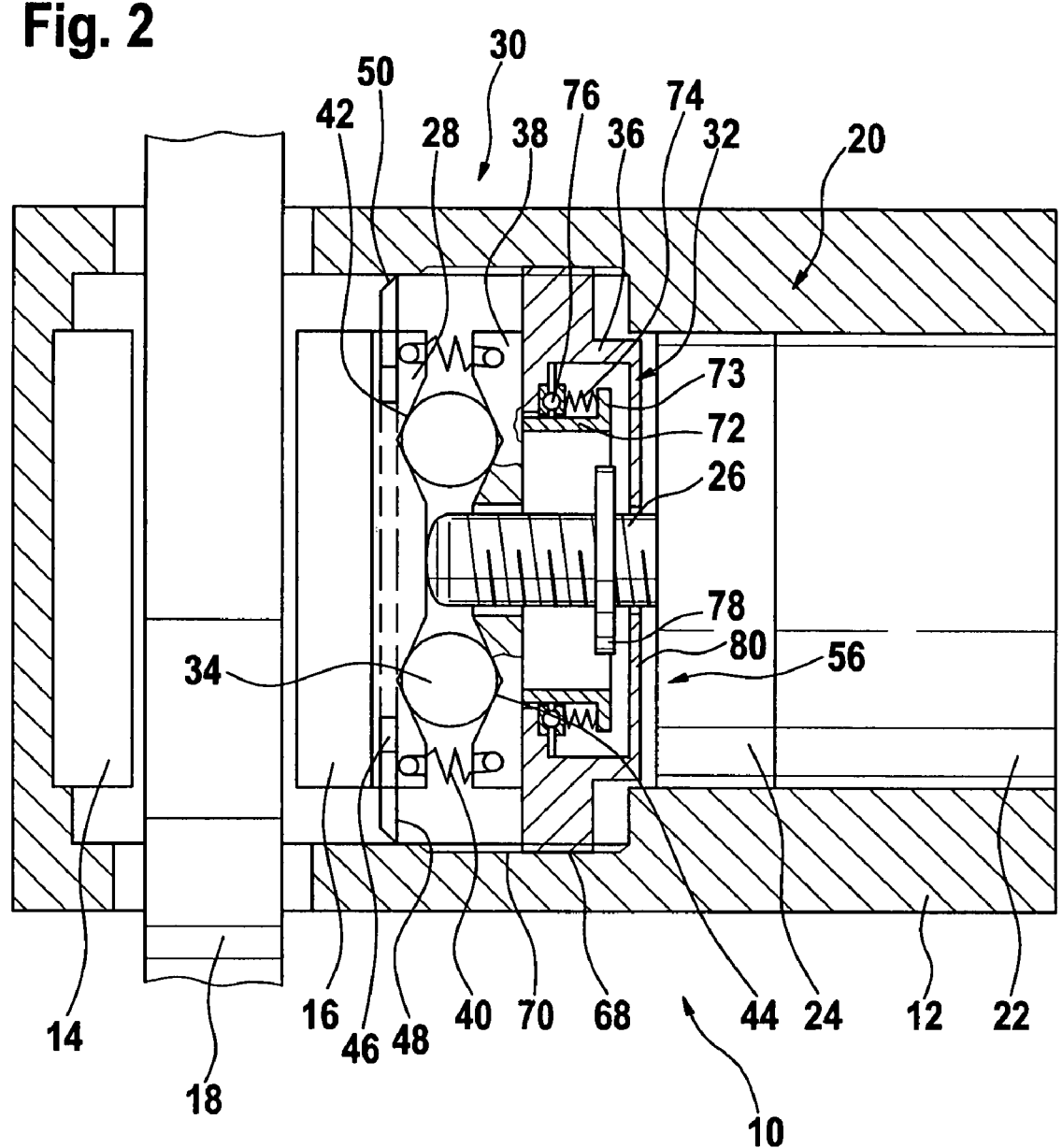
FIG. 2 shows a modified exemplary embodiment of the disk brake of FIG. 1 of the invention.

FIG. 2 shows a disk brake with a differently embodied device to compensate for wear-caused travel and with a different restoring device 56. Otherwise, the two disk brakes 10 are embodied identically and function in the same way. To avoid repetition, the above explanation of FIG. 1 is therefore referred to in this respect for explaining FIG. 2. For the same components, the same reference numerals are used in FIGS. 1 and 2.

For embodying the restoring device 56, the base plate 36 of the bracing means 32 of the disk brake 10 of FIG. 2 is embodied as a circular-annular disk, with a male thread 68 that meshes with a female thread 70 of the caliper 12. The threads 68, 70 are non-self-locking steep threads. A tubular attachment 72 to the ramp plate 38 reaches through the base plate 36. The attachment 72 has an outward protruding flange 73, and compression springs are disposed axially parallel between this flange and the base plate 36 and are braced on the base plate 36 via a common axial bearing 76. When the base plate 36 is resting on the ramp plate 38, the compression springs 74 are relaxed and do not rest on the base plate 36.

If the ramp plate 38, upon a brake actuation, moves in the direction of the brake disk 18 because of wear to the friction brake linings 14, 16, then the compression springs 74 press the base plate 36 in the direction of the brake disk 18.

Since the threads 68, 70 are non-self-locking, and since the base plate 36 is freely rotatable because of the axial bearing 76, the base plate 36 moves in a helical motion in the direction of the brake disk 18. If the base plate 36 is resting on the ramp plate 38, friction between the base plate 36 and the ramp plate 38 prevents rotation of the base plate 36, so that the base plate 36 axially braces the ramp plate 38.

For restoration, the spindle 26 is rotated in reverse. A ring 78 fixedly disposed on the spindle 26 strikes an inward-protruding flange 80 of the base plate 36 and moves the base plate away from the brake disk 18 in a helical motion. The compression springs 74 are tightened, and the ramp plate 38 is pulled away from the brake disk 18. With the ramp plate 38, via the tension springs 40, the wedge plate 28 is likewise pulled away from the brake disk 18.

The foregoing relates to preferred exemplary embodiments of the invention, it being understood that other variants and embodiments thereof are possible within the spirit and scope of the invention, the latter being defined by the appended claims.

We claim:

1. In a disk brake with self-boosting, having a friction brake lining and having an actuation unit with which the friction brake lining can be pressed against a brake disk, and having a self-boosting device which when the disk brake is actuated converts a frictional force, exerted by the brake disk against the friction brake lining pressed against the brake disk, into a contact-pressure force which in addition to the actuation unit presses the friction brake lining against the brake disk, and the self-boosting device has a bracing means, on which the friction brake lining is braced obliquely to the brake disk at a support angle upon braking and opposite which bracing means the friction brake lining moves in the direction of the brake disk when the friction brake lining is moved for braking in the direction of the brake disk, the improvement wherein the friction brake lining (16) comprises a return-travel limiter (48), which limits a travel by which the friction brake lining (16) is lifed from the brake disk (18) upon release of the disk brake (10); wherein the bracing means (32) is movable in the direction of the brake disk (18) and comprises a return-travel block (52, 54), which prevents a motion of the bracing means (32) away from the brake disk (18); and wherein the bracing means (32) comprises a spring element (40), which urges the bracing means (32) in the direction of the brake disk (18).

2. The disk brake in accordance with claim 1, wherein the disk brake (10) comprises mechanical self-boosting.

3. The disk brake in accordance with claim 2, wherein the disk brake comprises a wedge mechanism (34, 42, 44) for self-boosting.

4. The disk brake in accordance with claim 1, wherein the disk brake (10) comprises an electromechanical actuation unit (20).

5. The disk brake in accordance with claim 1, wherein the return-travel limiter (48) of the friction brake lining (16) is resilient transversely to the brake disk (18).

6. The disk brake in accordance with claim 1, wherein the return-travel block (52,54) of the bracing means (32) comprises a postitive-engagemenet detent device (52,54).

7. The disk brake in accordance with claim 1, wherein the return-travel limiter (48) of the friction brake lining (16) is friction-controlled.

8. The disk brake in accordance with claim 1, wherein the spring element (40), which urges the bracing means (32) in the direction of the brake disk (18), engages the friction brake lining (16).

9. The disk brake in accordance with claim 1, wherein the disk brake (10) comprises a restoring device (56) for the bracing means (32) and/or for the return-travel limiter (48).

* * * * *